United States Patent
Liao et al.

(10) Patent No.: US 12,452,504 B2
(45) Date of Patent: Oct. 21, 2025

(54) METHOD AND APPARATUS, ELECTRONIC DEVICE, COMPUTER-READABLE STORAGE MEDIUM, AND COMPUTER PROGRAM PRODUCT FOR OBTAINING COLOR IMAGE BASED ON FUSING NARROW BAND IMAGES

(71) Applicant: Tencent Technology (Shenzhen) Company Limited, Guangdong (CN)

(72) Inventors: Jun Liao, Shenzhen (CN); Jianhua Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 224 days.

(21) Appl. No.: 18/329,676

(22) Filed: Jun. 6, 2023

(65) Prior Publication Data

US 2023/0319378 A1    Oct. 5, 2023

Related U.S. Application Data

(63) Continuation of application No. PCT/CN2022/132625, filed on Nov. 17, 2022.

(30) Foreign Application Priority Data

Jan. 30, 2022   (CN) .......................... 202210114314.9

(51) Int. Cl.
*H04N 23/20* (2023.01)
*G06V 10/44* (2022.01)
(Continued)

(52) U.S. Cl.
CPC ............. *H04N 23/20* (2023.01); *G06V 10/44* (2022.01); *G06V 10/803* (2022.01); *H04N 23/55* (2023.01)

(58) Field of Classification Search
CPC ........ H04N 23/20; H04N 23/55; H04N 5/265; H04N 9/64; H04N 23/51; H04N 23/57;
(Continued)

(56) References Cited

U.S. PATENT DOCUMENTS

2011/0112362 A1    5/2011   Minetoma
2016/0290912 A1*  10/2016   Kent ................. G01N 35/00871
(Continued)

FOREIGN PATENT DOCUMENTS

CN    107306491 A    10/2017
CN    107405093 A    11/2017
(Continued)

OTHER PUBLICATIONS

Extended European Search Report dated Feb. 10, 2025 in application No. 22923416.6.
(Continued)

*Primary Examiner* — James M Pontius
(74) *Attorney, Agent, or Firm* — Sughrue Mion, PLLC

(57) ABSTRACT

This application provides an image processing method and apparatus that can: acquire a target object through each narrow-band filter to obtain a narrow-band channel image including the target object; and fuse multiple narrow-band channel images in one-to-one correspondence with the multiple narrow-band filters to obtain a color image including a contour of the target object.

19 Claims, 9 Drawing Sheets

(51) Int. Cl.
  *G06V 10/80* (2022.01)
  *H04N 23/55* (2023.01)
(58) Field of Classification Search
  CPC ...... H04N 23/12; H04N 23/54; H04N 23/951; G06V 10/44; G06V 10/803; G06V 20/693; G06T 1/0007; G06T 3/4015; G06T 3/4038; G06T 2200/32; G06T 2207/10048; G06T 2207/20192; G06T 2207/20221; G06T 2207/30024; G06T 2207/30096; G03B 33/00; G03B 33/04
  See application file for complete search history.

(56) References Cited

U.S. PATENT DOCUMENTS

| | | | | |
|---|---|---|---|---|
| 2022/0137275 | A1* | 5/2022 | Yang | H04N 25/135 359/580 |
| 2023/0185125 | A1* | 6/2023 | Ruan | G02F 1/13475 349/96 |
| 2023/0401303 | A1* | 12/2023 | Nozawa | G06T 7/00 |

FOREIGN PATENT DOCUMENTS

| | | |
|---|---|---|
| CN | 110731748 A | 1/2020 |
| CN | 111866318 A | 10/2020 |
| CN | 114449146 A | 5/2022 |
| JP | 2007-20880 A | 2/2007 |

OTHER PUBLICATIONS

Li et al. "Image Demosaicing: A Systematic Survey", Visual Communications and Image Processing 2008, Proc. of SPIE-IS&T Electronic Imaging, SPIE vol. 6822, 68221J, 2008, 15 pages.

Yi et al., "Contrast-Enhancing Snapshot Narrow-Band Imaging Method for Real-Time Computer-Aided Cervical Cancer Screening", Journal of Digital Imaging, vol. 33, 2020, pp. 211-220.

International Search Report for PCT/CN2022/132625 dated Feb. 7, 2023.

Written Opinion for PCT/CN2022/132625 dated Feb. 7, 2023.

Communication issued May 7, 2025 in Japanese Application No. 2024-523515.

* cited by examiner

METHOD AND APPARATUS, ELECTRONIC DEVICE, COMPUTER-READABLE STORAGE MEDIUM, AND COMPUTER PROGRAM PRODUCT FOR OBTAINING COLOR IMAGE BASED ON FUSING NARROW BAND IMAGES

CROSS-REFERENCE TO RELATED APPLICATION

This application is a continuation of International Application No. PCT/CN2022/132625 filed on Nov. 17, 2022 and claims priority to Chinese Patent Application No. 202210114314.9, filed with the China National Intellectual Property Administration on Jan. 30, 2022, is the disclosure of both being incorporated by reference in their entireties.

FIELD

This application relates to graphics and image processing technologies, and in particular, to an image processing method and apparatus, an electronic device, a computer-readable storage medium, and a computer program product.

BACKGROUND

With the development of an image processing technology, an electronic device may implement more abundant and vivid images. Compared with text, images carry richer and more expressive information, and are thus more and more popular with users.

An image of a target object is acquired by the electronic device, whereby the acquired image includes the target object, and the target object may be positioned by the acquired image for subsequent operations, based on the position of the target object, for example on a pathological image. A pathological site is quickly positioned by the pathological image for subsequent accurate pathological sampling based on the pathological site.

However, in the related art, the image acquired by the electronic device cannot clearly define the target object and other non-target objects, thereby reducing an imaging effect of the image.

SUMMARY

Some embodiments of the disclosure provide an image processing method and apparatus, an electronic device, a computer-readable storage medium, and a computer program product, which can fully and effectively display a target object and improve an imaging effect of an image.

Technical solutions in some embodiments of the disclosure are implemented as follows.

Some embodiments of the disclosure provide an image processing method. The method may be performed by an electronic device. The electronic device includes multiple narrow-band filters.

The method includes:
acquiring a target object through each of the narrow-band filters to obtain a narrow-band channel image including the target object; and
fusing multiple narrow-band channel images in one-to-one correspondence with the multiple narrow-band filters to obtain a color image including a contour of the target object.

Some embodiments of the disclosure provide an image processing apparatus. The apparatus includes:

an acquisition module, configured to acquire a target object through multiple narrow-band filters to obtain a narrow-band channel image including the target object; and
a fusion module, configured to fuse multiple narrow-band channel images in one-to-one correspondence with the multiple narrow-band filters to obtain a color image including a contour of the target object.

Some embodiments of the disclosure provide an electronic device. The electronic device includes:
a memory, configured to store computer-executable instructions; and
a processor, configured to implement, when executing the computer-executable instructions stored in the memory, the image processing method provided in some embodiments of the disclosure.

Some embodiments of the disclosure provide an electronic device. The electronic device includes:
a housing, configured to form a partially enclosed space;
multiple narrow-band filters, located on a photosensitive chip inside the housing and configured to: acquire an optical signal, the photosensitive chip being configured to output a photosensitive signal; and
a processor, located inside the housing and configured to:
receive the photosensitive signal which may be outputted by the photosensitive chip and may be an optical signal of a target object acquired by the multiple narrow-band filters, generate a narrow-band channel image including the target object based on the photosensitive signal, and
fuse multiple narrow-band channel images in one-to-one correspondence with the multiple narrow-band filters to obtain a color image including a contour of the target object.

This embodiment of the disclosure provide a computer-readable storage medium storing computer-executable instructions for implementing, when executed by a processor, the image processing method provided in this embodiment of the disclosure.

This embodiment of the disclosure provide a computer program product, including computer programs or computer-executable instructions. The computer programs or computer-executable instructions, when executed by a processor, implement the image processing method provided in this embodiment of the disclosure.

Some embodiments of the disclosure has the following beneficial effects.

By acquiring a target object through narrow-band filters, the target object can be accurately acquired, and narrow-band channel images corresponding to the multiple narrow-band filters are fused to obtain a color image including a contour of the target object, whereby the target object and non-target objects in the color image are clearly defined by the color image acquired by an electronic device, so as to fully and effectively display the target object and improve an imaging effect of an image.

DETAILED DESCRIPTION

Figure 1:
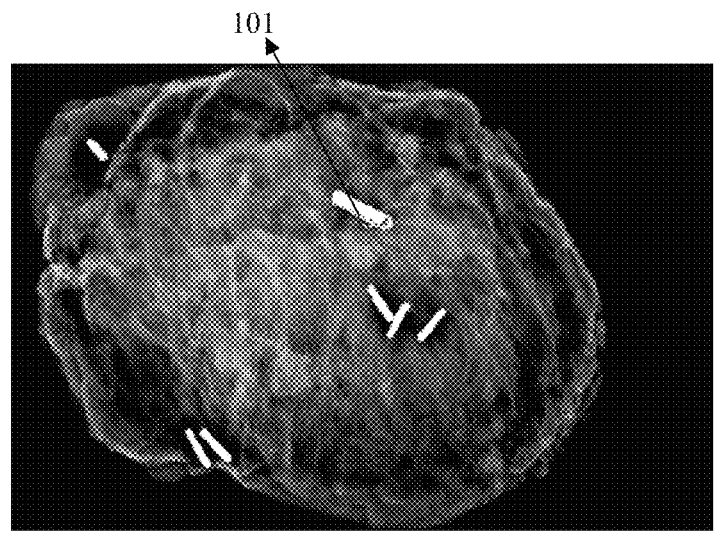
FIG. 1 is a schematic diagram of an X-ray transmission image provided in the related art.

To make the objects, technical solutions, and advantages of the disclosure clearer, the following describes implementations of the disclosure in further detail with reference to the accompanying drawings. The described embodiments are not to be considered as a limitation to the present disclosure. All other embodiments obtained by a person of ordinary skill in the art without creative efforts shall fall within the protection scope of the disclosure.

The term "first/second" involved in the following description is only for distinguishing between similar objects and does not represent a particular sequence of the objects. It may be understood that "first/second" may be interchanged to particular sequences or orders if allowed to implement the embodiments of the disclosure described herein in sequences other than that illustrated or described herein.

Unless otherwise defined, meanings of all technical and scientific terms used in this specification are the same as those usually understood by a person skilled in the art to which the disclosure belongs. The terms used in this specification are for the purpose of describing the embodiments of the disclosure only and are not intended to be limiting of the disclosure.

Before the embodiments of the disclosure are further described in detail, a description is made on nouns and terms in the embodiments of the disclosure, and the nouns and terms in the embodiments of the disclosure are applicable to the following explanations.

1) Response: The response represents a condition or state upon which performed operations depend, where one or more of the performed operations may be real-time or may have a set delay when the dependent condition or state is satisfied. Without being specifically stated, there is no limitation to the order in which the operations are performed.

2) Pathological Image: The pathological image is an image for presenting pathological morphology of body organs, tissues, or cells. Based on the pathological image, it is possible to explore causes, pathogenesis, and progression of lesions. The pathological image includes lesion section images (images formed by cutting lesion tissues of a certain size in order to observe lesion changes), endoscopic images, and the like.

3) Narrow-band Filter: The narrow-band filter is also referred to as a narrow-band optical filter, which may be an optical filter subdivided from a band-pass optical filter. The narrow-band optical filter allows an optical signal to pass in a specific band, while optical signals on both sides deviating from the band are blocked. The pass band of the narrow-band optical filter may be relatively narrow, being less than 5% of a central wavelength value, and the half-width of the pass band of the narrow-band optical filter may be less than 10 nm.

In the related art, in a cancer resection surgery (for example, a conservative surgery), an edge position of a tumor is accurately known, and complete resection of the tumor region can prevent disease relapse of a patient and avoid secondary surgery. Postoperative tissue pathological analysis is the gold standard for tumor diagnosis. During the surgery, the resected tissues of the patient will be cut into tissue blocks of an appropriate volume. After selection by a doctor, the tissue blocks will be fixed by formalin immersion and other methods. Then, through a series of operations such as dehydration, wax immersion and embedding, section and pasting, staining and sealing, pathological sections which may be observed under a microscope are finally prepared. In order to obtain accurate patient lesion information, the process of selecting the tissue blocks by the doctor is particularly important. The omission of tissue blocks containing lesions will limit doctors to make more accurate determination, while the excessive selection of tissue blocks will greatly increase the workload of film preparation and reduce medical efficiency.

The main basis for the doctor to perform intraoperative tumor lesion edge detection and postoperative pathological materials selection is mainly divided into two aspects: For hospitals with limited medical conditions, the doctor mainly distinguishes a tumor region through naked eye observation and touch hand feeling for tissue block selection. The method is a very difficult task for inexperienced doctors. Especially in the case of a hidden tumor bed, it is impossible to identify a normal tissue region and a lesion region by pathologist's vision, and the touch hand feeling is very subjective. In the other aspect, a radiologic image method is used for distinguishing the lesion region and assisting pathological sampling, such as an optical imaging platform. The platform may give an X-ray transmission image of the resected tissue (as shown in FIG. 1, a strip 101 is a marker for marking a position), assist the doctor in finding the lesion more accurately during the surgery, and also assist in the pathological sampling in a biopsy procedure. However, the interpretation of X-ray image mainly depends on the experience of the doctor. There is certain subjectivity, and different doctors sometimes have objection in interpretation structures. In addition, an X-ray device is expensive.

In order to solve the foregoing problem, some embodiments of the disclosure provides an image processing method and apparatus, an electronic device, a computer-readable storage medium, and a computer program product, which can fully and effectively display a target object and improve an imaging effect of an image.

The image processing method provided in some embodiments of the disclosure may be implemented by a terminal alone, or implemented by a terminal and a server in cooperation. For example, the terminal performs the following image processing method alone, or the terminal transmits an image acquisition request (a narrow-band channel image including a target object) to the server. The server performs the image processing method according to the received image acquisition request, and fuses narrow-band channel images corresponding to multiple narrow-band filters to obtain a color image including a contour of the target object.

The electronic device provided in some embodiments of the disclosure may be various types of terminals or servers having an imaging function. The server may be an independent physical server, a server cluster or a distributed system composed of multiple physical servers, or a cloud server providing basic cloud computing services, such as a cloud service, a cloud database, cloud computing, a cloud function, cloud storage, a network service, cloud communication, a middleware service, a domain name service, a security service, a content delivery network (CDN), and big data and artificial intelligence platforms. The cloud service may be an image processing service for the terminal to invoke. The terminal may be a smart camera, a smartphone, a tablet computer, a laptop computer, a desktop computer, a smart speaker, a smart voice interaction device, a vehicle-mounted terminal, or the like, but is not limited thereto. The terminal and the server may be directly or indirectly connected in a wired or wireless communication manner. This is not limited by the disclosure herein.

Figure 2:
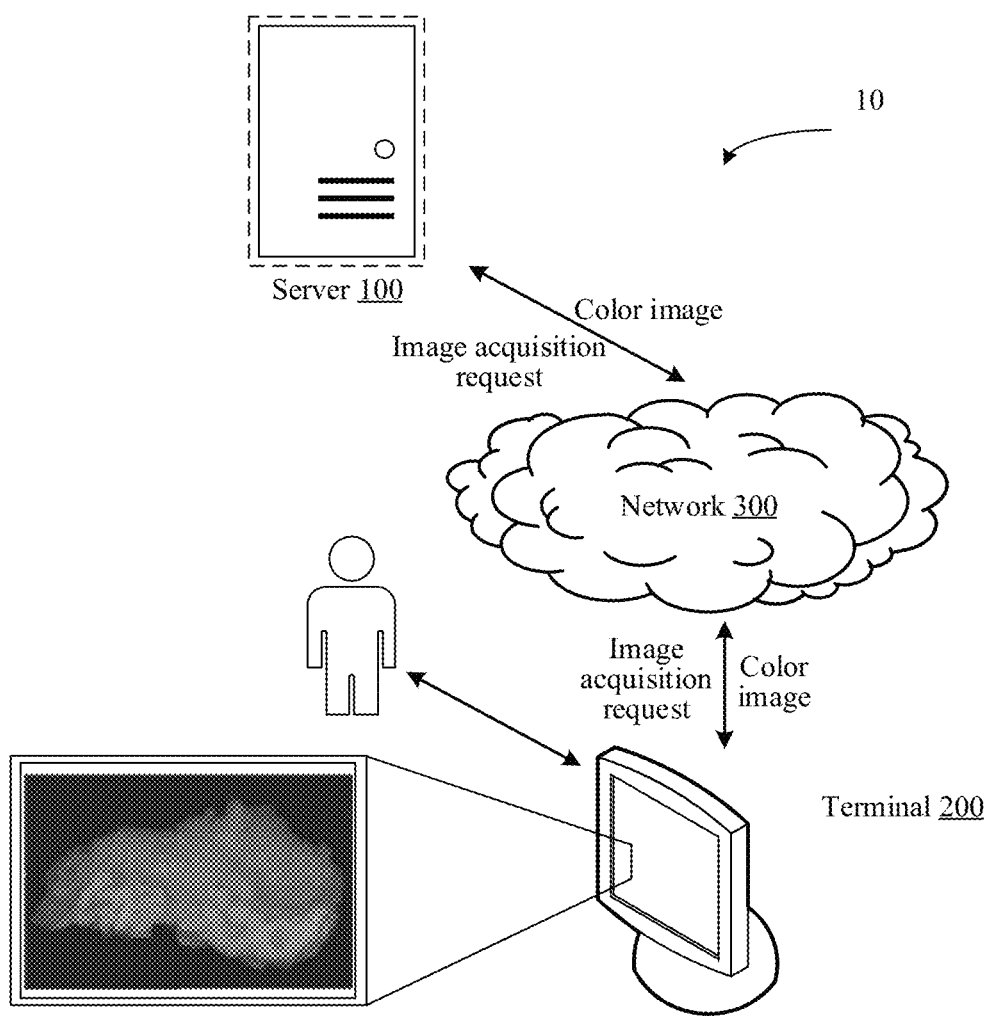
FIG. 2 is a schematic architectural diagram of an image processing system 100 according to some embodiments of the disclosure.

Reference is made to FIG. 2. FIG. 2 is a schematic architectural diagram of an image processing system 100 according to some embodiments of the disclosure. A terminal 200 is connected to a server 100 via a network 300. The network 300 may be a wide area network or a local area network, or a combination of both.

In some embodiments, the electronic device may be a terminal having a presentation imaging function. The image processing method provided in some embodiments of the disclosure may be implemented by the terminal 200. For example, a user acquires a target object through narrow-band filters in the terminal 200 to obtain a narrow-band channel image (also referred to as a single-channel image) including the target object, and fuses the narrow-band channel images corresponding to the multiple narrow-band filters to obtain a color image including a contour of the target object. For example, for a pathological image, a pathological tissue may be acquired through the narrow-band filters in the terminal 200 to obtain a narrow-band channel image including the pathological tissue, the narrow-band channel images corresponding to the multiple narrow-band filters are fused to obtain a color image (pathological image) including a contour of the pathological tissue, and a pathological site may be quickly positioned by the pathological image for subsequent accurate pathological sampling based on the pathological site.

In some embodiments, the image processing method provided in some embodiments of the disclosure may be implemented by a terminal and a server in cooperation. For example, a user acquires a target object through narrow-band filters in the terminal 200 to obtain a narrow-band channel image including the target object. The terminal 200 may transmits the narrow-band channel image including the target object to the server 100. The server 100 fuses the narrow-band channel images corresponding to the multiple narrow-band filters to obtain a color image including a contour of the target object, and transmits the color image to the terminal 200. The terminal 200 displays the color image. For example, for a pathological image, a pathological tissue may be acquired through the narrow-band filters in the terminal 200 to obtain a narrow-band channel image including the pathological tissue. The terminal 200 transmits the narrow-band channel image including the pathological tissue to the server 100. The server 100 fuses the narrow-band channel images corresponding to the multiple narrow-band filters to obtain a color image (pathological image) including a contour of the pathological tissue, and transmits the pathological image to the terminal 200 for display, so as to quickly position a pathological site by the pathological image for subsequent accurate pathological sampling based on the pathological site.

In some embodiments, the terminal or the server may implement the image processing method provided in some embodiments of the disclosure by executing a computer program. For example, the computer program may be a native program or a software module in an operating system. The computer program may also be a native application (APP), namely a program executable after being installed in the operating system. The computer program may also be a mini program, namely a program executable after being downloaded in a browser environment. The computer program may also be a mini program embeddable into any APP. In general, the computer program may be any form of application, module, or plug-in.

Some embodiments of the disclosure may be implemented via a cloud technology. The cloud technology is a general term of a network technology, an information technology, an integration technology, a management platform technology, and an application technology based on cloud computing business model application. The technology may be used as needed and flexibly and conveniently by composing a resource pool. The cloud computing technology becomes an important support. A background service of a technical network system requires a large amount of computing and storage resources.

In some embodiments, multiple servers may be composed into a blockchain, and the server 100 may be a node on the blockchain. An information connection may exist between the nodes in the blockchain, and information transmission may be performed between the nodes through the information connection. Data (for example, logic and color images for image processing) related to the image processing method provided in some embodiments of the disclosure may be stored on the blockchain. Since the blockchain has the property of being non-tamperable, the accuracy of the data in the blockchain can be ensured.

Figure 3:
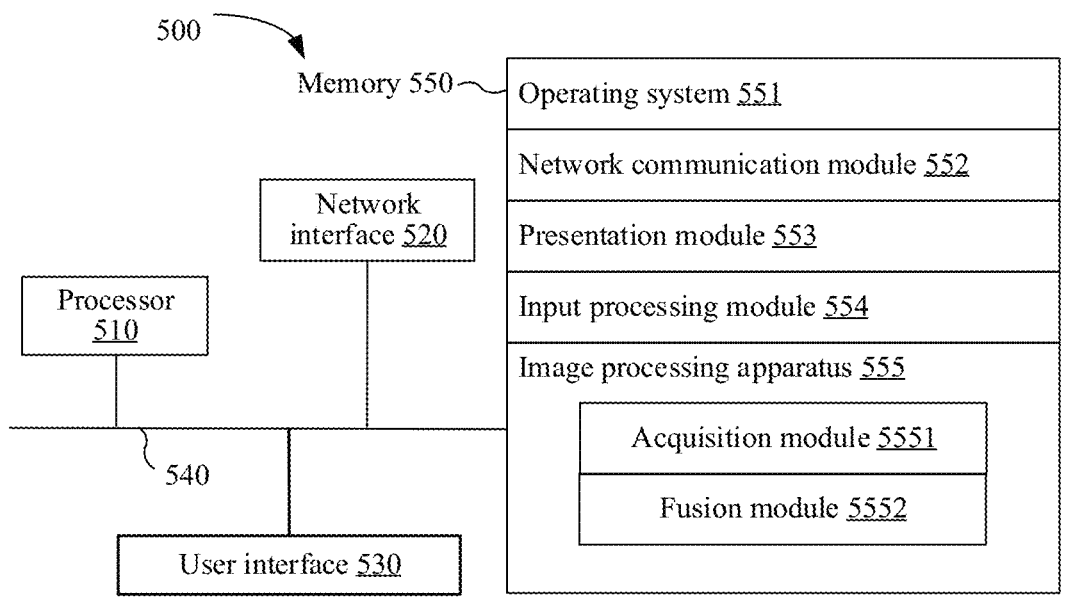
FIG. 3 is a schematic structural diagram of an image processing apparatus according to some embodiments of the disclosure.

Reference is made to FIG. 3. FIG. 3 is a schematic structural diagram of an image processing apparatus according to some embodiments of the disclosure. For example, the apparatus may be a terminal having an imaging function. The image processing apparatus shown in FIG. 3 includes: at least one processor 510, a memory 550, and at least one network interface 520. Components in the image processing apparatus 500 are coupled together through a bus system 540. It may be understood that, the bus system 540 may be configured to implement connection and communication between the components. In addition to a data bus, the bus system 540 further includes a power bus, a control bus, and a state signal bus. However, for ease of clear description, all types of buses in FIG. 3 are marked as the bus system 540.

The processor 510 may be an integrated circuit chip having signal processing capabilities, for example, a general processor, a digital signal processor (DSP), another programmable logic device, discrete gate or transistor logic device, or discrete hardware component, or the like. The general processor may be a microprocessor, any conventional processor, or the like.

The memory 550 may be removable, non-removable, or a combination thereof. Exemplary hardware devices include solid state memories, hard disk drives, optical disk drives, and the like. The memory 550 includes, for example, one or more storage devices physically remote from the processor 510.

The memory 550 includes a volatile memory or a non-volatile memory, or may include both a volatile memory and a non-volatile memory. The non-volatile memory may be a read only memory (ROM), and the volatile memory may be a random access memory (RAM). The memory 550 described in some embodiments of the disclosure aims to include any suitable type of memory.

In some embodiments, the memory 550 may be capable of storing data to support various operations. Examples of the data include programs, modules, and data structures or subsets or supersets thereof, as exemplified below.

An operating system 551 includes a system program for processing various basic system services and executing hardware-related tasks, such as a framework layer, a core library layer, and a driver layer, for realizing various basic services and processing hardware-based tasks.

A network communication module 552 may be configured to reach other electronic devices via one or more (wired or wireless) network interfaces 520. The network interface 520 exemplarily includes: Bluetooth, wireless fidelity (WiFi), and universal serial bus (USB), and the like.

A presentation module 553 may be configured to enable presentation of information (for example, a user interface for operating peripherals and displaying content and information) via one or more output apparatuses (for example, a display screen, a speaker, or the like) associated with a user interface 530.

An input processing module 554 may be configured to detect one or more user inputs or interactions from one or more input apparatuses 532 and translate the detected inputs or interactions.

In some embodiments, the image processing apparatus provided in some embodiments of the disclosure may be implemented in software. FIG. 3 shows an image processing apparatus 555 stored in a memory 550, which may be software in the form of a program and a plug-in. The apparatus includes the following software modules: an acquisition module 5551 and a fusion module 5552. These modules are logical and thus may be combined randomly or further split depending on the functions implemented. The functions of the individual modules will be described below.

The description of a hardware structure of an electronic device according to some embodiments of the disclosure is continued below.

Figure 4:
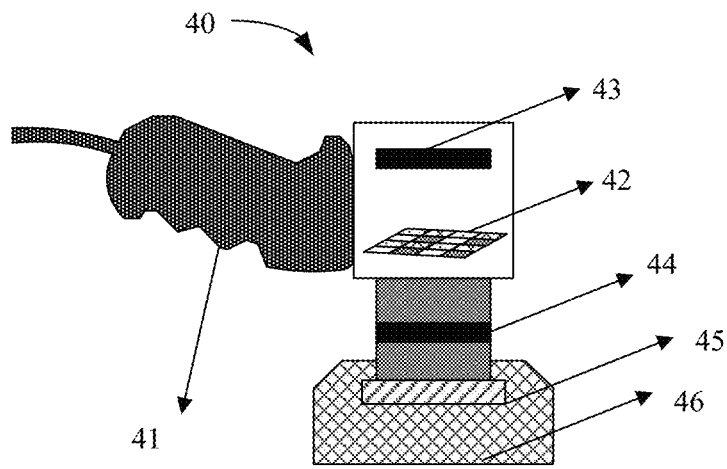
FIG. 4 is a schematic diagram of a hardware structure of an electronic device 30 according to some embodiments of the disclosure.

Reference is made to FIG. 4. FIG. 4 is a schematic diagram of a hardware structure of an electronic device 40 according to some embodiments of the disclosure. The electronic device includes: a housing 41, configured to form a partially enclosed space; multiple narrow-band filters 42, located on a photosensitive chip inside the housing 41 and configured to: acquire an optical signal, the photosensitive chip being configured to output a photosensitive signal; and a processor 43, located inside the housing 41 and configured to: receive the photosensitive signal which is outputted by the photosensitive chip and may be an optical signal of a target object acquired by the multiple narrow-band filters, generate a narrow-band channel image including the target object based on the photosensitive signal, and fuse multiple narrow-band channel images in one-to-one correspondence with the multiple narrow-band filters 42 to obtain a color image including a contour of the target object.

By acquiring a target object through narrow-band filters, the target object can be accurately acquired, and narrow-band channel images corresponding to the multiple narrow-band filters are fused to obtain a color image including a contour of the target object, whereby the target object and non-target objects in the color image are clearly defined by the color image acquired by an electronic device, so as to fully and effectively display the target object and improve an imaging effect of an image.

Figure 9A:
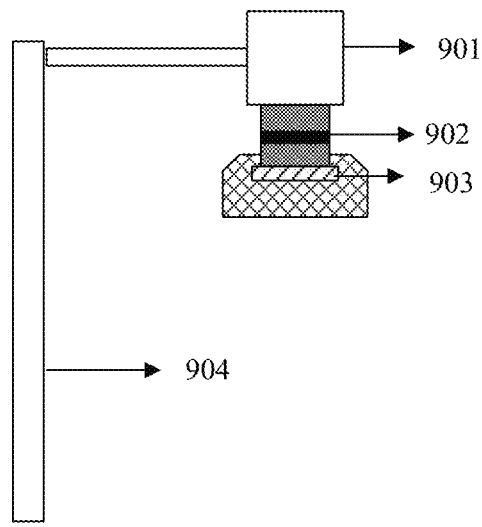
FIG. 9A is a schematic diagram of a support-type imaging system according to some embodiments of the disclosure.
Figure 9B:
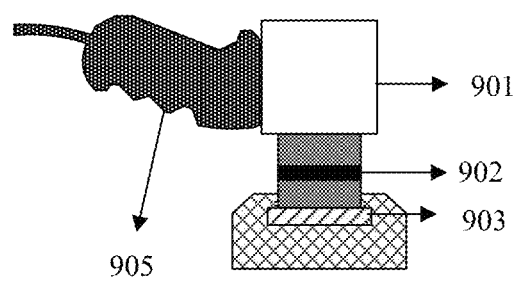
FIG. 9B is a schematic diagram of a handheld imaging system according to some embodiments of the disclosure.

The electronic device 30 may be any electronic device having an imaging function, for example, a smartphone, a camera, or the like. The housing 41 of the electronic device 40 may be a housing in the form of a support (including a support 904 as shown in FIG. 9A), whereby the electronic device can be fixed by the support, thereby avoiding jitter of the electronic device. The housing 41 of the electronic device 40 may also be a housing in the form of a handle (including a handle 905 as shown in FIG. 9B), whereby the electronic device can be held by the handle for flexible photographing. The photosensitive chip may be an infrared photosensitive chip, and may also be an ordinary photosensitive chip. The photosensitive effect of the infrared photosensitive chip is better than that of the ordinary photosensitive chip.

The narrow-band channel image represents two-dimensional features. The first-dimensional feature is a feature using different absorption peaks of a target object (for example, a pathological tissue) for different narrow-band light wave spectra, and the second-dimensional feature is a feature of different penetration depths of light waves in the range of these absorption peaks at the target object. The contrast effect of the narrow-band channel image is prominent. For example, for a 1450 nanometers (nm) filter, a narrow-band channel image with a prominent contour of the target object and a light transmission wavelength of 1450 nm may be obtained. For a 1300 nm filter, a narrow-band channel image with a prominent contour of the target object and a light transmission wavelength of 1300 nm may be obtained. For a 1050 nm filter, a narrow-band channel image with a prominent contour of the target object and a light transmission wavelength of 1050 nm may be obtained.

The size of each narrow-band filter matches the size of the pixels on the photosensitive chip (namely, the size of the pixels on the photosensitive chip is greater than or equal to the size of each narrow-band filter). For example, if the side length of the pixels on the photosensitive chip is 5 microns, the side length of each narrow-band filter cell may be 5 microns. If the size of the pixels on the photosensitive chip is 8 microns*8 microns, the size of each narrow-band filter may be 8 microns*8 microns, so as to ensure that there is a narrow-band filter on each pixel on the photosensitive chip.

In some embodiments, the multiple narrow-band filters are regularly arranged on the photosensitive chip in a matrix form. The processor may be further configured to: generate an image including the target object based on the photosensitive signal, perform channel splitting processing on the image including the target object based on each of the narrow-band filters in the photosensitive chip to obtain an intermediate channel image corresponding to each of the narrow-band filters, and interpolate the intermediate channel image corresponding to each of the narrow-band filters to obtain the narrow-band channel image corresponding to each of the narrow-band filters.

By way of example, the foregoing operation of performing channel splitting processing on the image including the target object based on each of the narrow-band filters in the photosensitive chip to obtain an intermediate channel image corresponding to each of the narrow-band filters may be implemented through the following technical solution: performing the following processing on any one of the narrow-band filters in the photosensitive chip: determining a position of the narrow-band filter in the photosensitive chip; performing pixel extraction processing of corresponding channel on the image including the target object based on the position of the narrow-band filter in the photosensitive chip to obtain pixels of the narrow-band filter; and arranging the pixels of the narrow-band filter based on arrangement of the narrow-band filter in the photosensitive chip to obtain the intermediate channel image corresponding to the narrow-band filter.

Figure 6:
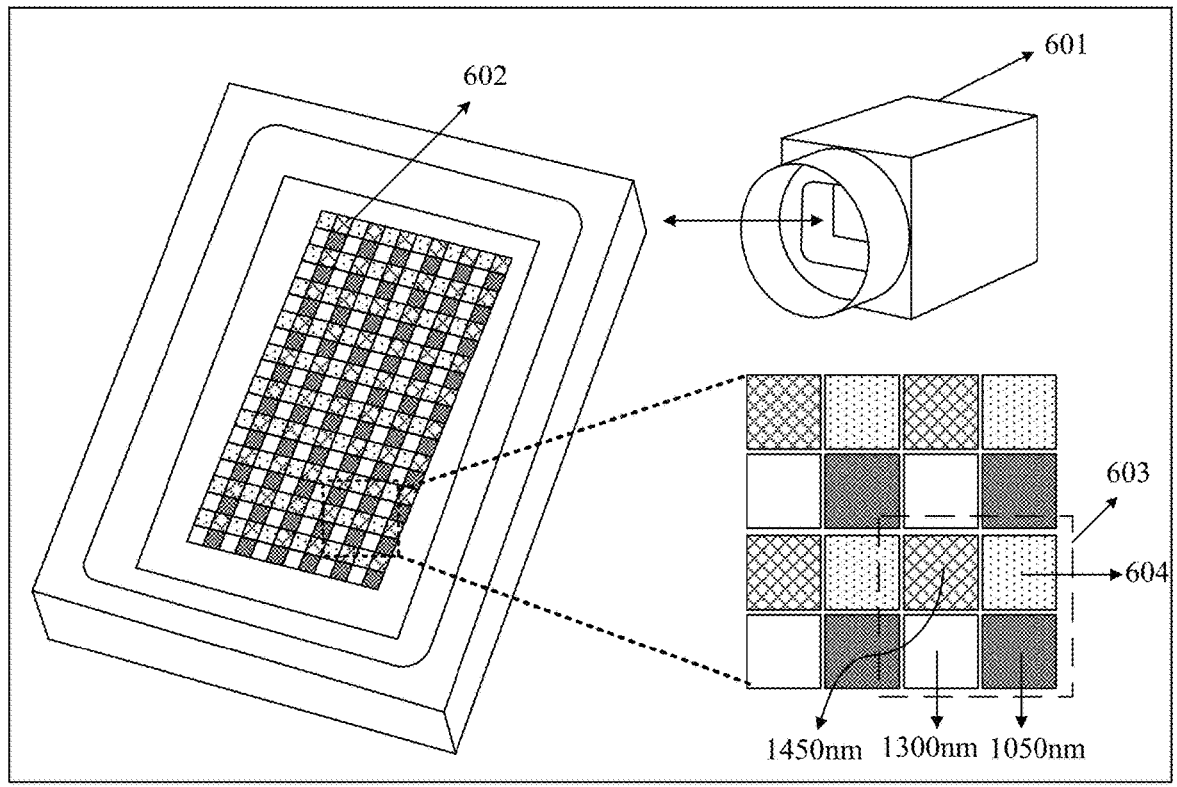
FIG. 6 is a schematic structural diagram of a short-wave infrared camera according to some embodiments of the disclosure.

As shown in FIG. 6, a filter matrix 603 includes multiple narrow-band filters (a 1450 nm narrow-band filter, a 1300 nm narrow-band filter, and a 1050 nm narrow-band filter shown in FIG. 6). The filter matrix 603 may be repeatedly arranged on the photosensitive chip in a 2*2 period for acquiring narrow-band channel images regularly arranged.

Figure 8:
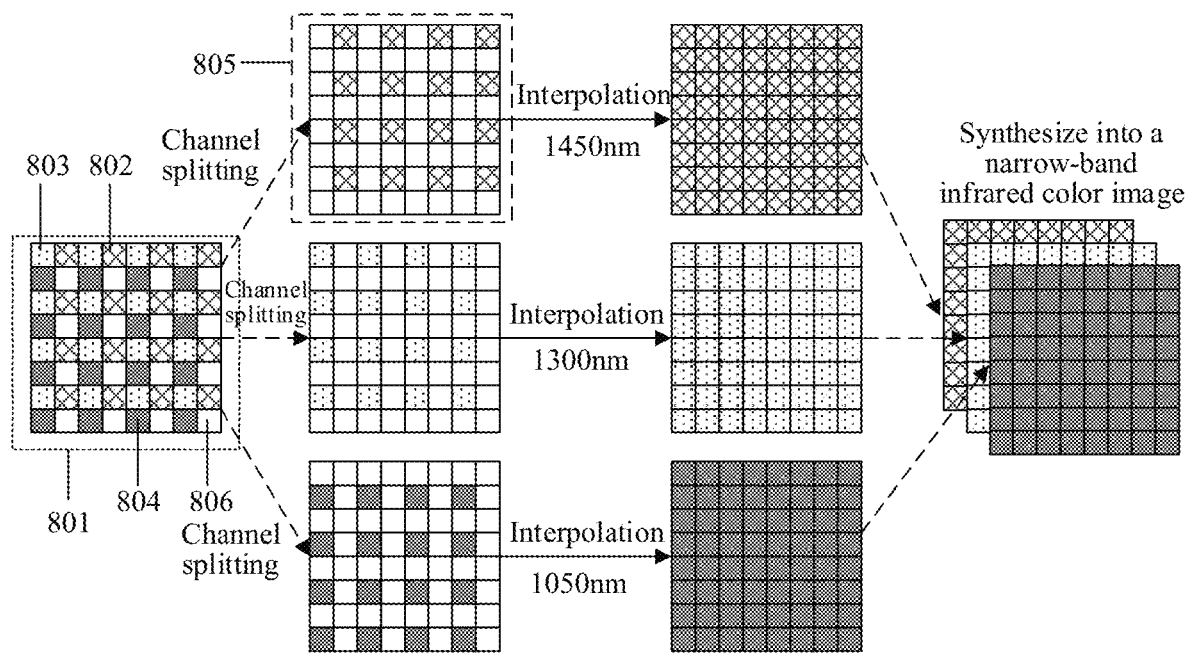
FIG. 8 is a schematic diagram of a synthetic color image according to some embodiments of the disclosure.

By way of example, as shown in FIG. 8, a customized filter matrix 801 includes multiple narrow-band filters (a 1450 nm narrow-band filter 802, a 1300 nm narrow-band filter 803, a 1050 nm narrow-band filter 804, and a wide-band filter 806). The 1450 nm narrow-band filter 802 is taken as an example. A pixel corresponding to a 1450 nm channel covered by the 1450 nm narrow-band filter 802 from the image including the target object is extracted as a pixel corresponding to the 1450 nm filter. Based on the arrangement of the 1450 nm narrow-band filter on the photosensitive chip, the pixels of the 1450 nm narrow-band filter are arranged to obtain an intermediate channel image corresponding to the 1450 nm filter. For example, when the 1450 nm narrow-band filter may be arranged at (0, 2), (0, 4), (0, 6), and (0, 8) on the photosensitive chip, and the extracted pixels are arranged at (0, 2), (0, 4), (0, 6), and (0, 8) to obtain an intermediate channel image 805 corresponding to the 1450 nm filter.

By way of example, referring to FIG. 8, the 1450 nm narrow-band filter may be also taken as an example. Null pixels in the intermediate channel image 805 are interpolated, namely, pixel values are assigned to the null pixels. The assigned pixel values are pixel values of non-null pixels in the intermediate channel image 805.

For example, the 1450 nm narrow-band filter, the 1300 nm narrow-band filter, and the 1050 nm narrow-band filter are taken as an example. For the acquired image including the target object, pixels covered by the 1450 nm filter are extracted from the image including the target object as pixels corresponding to the 1450 nm filter. Based on the arrangement of the narrow-band filter on the photosensitive chip, the pixels of the narrow-band filter are arranged to obtain an intermediate channel image corresponding to the 1450 nm filter, and the 1450 nm intermediate channel image is interpolated to obtain a 1450 nm narrow-band channel image (namely, a narrow-band channel image with a light transmission wavelength of 1450 nm). Pixels covered by the 1300 nm filter are extracted from the image including the target object as pixels corresponding to the 1300 nm filter. Based on the arrangement of the narrow-band filter on the photosensitive chip, the pixels of the narrow-band filter are arranged to obtain an intermediate channel image corresponding to the 1300 nm filter, and the 1300 nm intermediate channel image is interpolated to obtain a 1300 nm narrow-band channel image (namely, a narrow-band channel image with a light transmission wavelength of 1300 nm). Pixels covered by the 1050 nm filter are extracted from the image including the target object as pixels corresponding to the 1050 nm filter. Based on the arrangement of the narrow-band filter on the photosensitive chip, the pixels of the narrow-band filter are arranged to obtain an intermediate channel image corresponding to the 1050 nm filter, and the 1050 nm intermediate channel image is interpolated to obtain a 1050 nm narrow-band channel image (namely, a narrow-band channel image with a light transmission wavelength of 1050 nm).

In some embodiments, the multiple narrow-band channel images have the same size. The multiple narrow-band channel images are obtained by performing channel splitting processing on the image including the target object. The processor is further configured to: performing the following processing on any pixel in the image including the target object: determining a pixel value of the pixel corresponding to each of the multiple narrow-band channel images; synthesizing the pixel values of the pixels corresponding to the multiple narrow-band channel images to obtain multi-channel pixel values of the pixels; and stitching the multi-channel pixel values of the multiple pixels to obtain the color image including the contour of the target object. Some embodiments of the disclosure can effectively synthesize multiple pixel values of the same pixel, thereby improving an imaging effect of the color image.

By way of example, with continued reference to FIG. 8, the multiple narrow-band channel images have the same size. The multiple narrow-band channel images are obtained by performing channel splitting processing on an image (original image) including a target object, namely, the size of the multiple narrow-band channel images is the same as the size of the original image. For example, any pixel is a pixel at (0, 0) in the original image. Pixel values of pixels at (0, 0) corresponding to the multiple narrow-band channel images are determined, and multiple pixel values are determined equivalently. The synthesis processing may be: averaging the multiple pixel values, and taking an average result as multi-channel pixel values of the pixels at (0, 0) corresponding to the multiple narrow-band channel images. Based on the foregoing method, the multi-channel pixel values of the pixels corresponding to (0, 1) may be obtained, and the multi-channel pixel values of the pixels corresponding to all positions in the original image are stitched to obtain a final color image.

For example, a 1450 nm narrow-band filter, a 1300 nm narrow-band filter, and a 1050 nm narrow-band filter are taken as an example. The narrow-band channel image includes a narrow-band channel image with a light transmission wavelength of 1450 nm, a narrow-band channel image with a light transmission wavelength of 1300 nm, and a narrow-band channel image with a light transmission wavelength of 1050 nm. The sizes of the narrow-band channel image with the light transmission wavelength of 1450 nm, the narrow-band channel image with the light transmission wavelength of 1300 nm, and the narrow-band channel image with the light transmission wavelength of 1050 nm are the same. A pixel value of the same pixel corresponding to each narrow-band channel image is determined. The pixel values of the same pixel corresponding to the multiple narrow-band channel images are synthesized to obtain multi-channel pixel values of the same pixel. The multi-channel pixel values of the pixels are stitched according to the positions of the pixels to obtain a color image including the contour of the target object, thereby synthesizing the narrow-band channel image with the light transmission wavelength of 1450 nm, the narrow-band channel image with the light transmission wavelength of 1300 nm, and the narrow-band channel image with the light transmission wavelength of 1050 nm into the color image.

In some embodiments, the electronic device further includes: an achromatic lens, disposed inside the housing and configured to focus narrow-band waves acquired by the multiple narrow-band filters onto the photosensitive chip. The narrow band waves may be focused by some embodiments of the disclosure, whereby the electronic device may subsequently acquire a narrow-band channel image.

As shown in FIG. 4, the electronic device 40 includes an achromatic lens 44 (for example, an infrared apochromatic lens). The achromatic lens 44 may ensure that several narrow-band wavelengths can be clearly focused on the surface of the photosensitive chip at the same time to obtain a higher image resolution.

Certainly, the achromatic lens 44 may also be an ordinary lens, which does not have an achromatic function, namely does not ensure that several narrow-band wavelengths can be clearly focused on the surface of the photosensitive chip at the same time.

In some embodiments, the achromatic lens further includes: a focusing ring, disposed on a surface of the achromatic lens and configured to adjust a focal length of the achromatic lens; or, a liquid lens, disposed on the achromatic lens and configured to adjust the focal length of the achromatic lens.

Figure 12A:
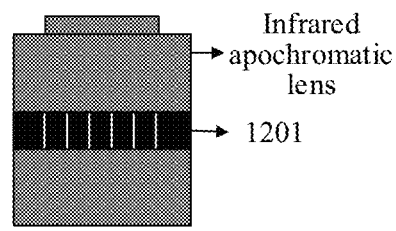
FIG. 12A is a schematic diagram of a focusing ring according to some embodiments of the disclosure.
Figure 12B:
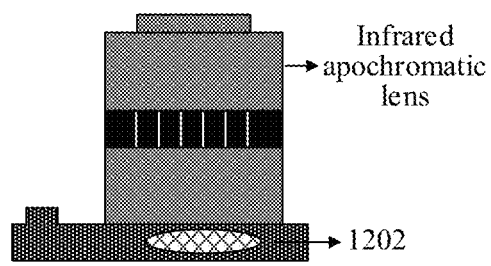
FIG. 12B is a schematic diagram of a liquid lens according to some embodiments of the disclosure.

As shown in FIG. 4, the electronic device 40 includes an achromatic lens 44 (for example, an infrared apochromatic lens). As shown in FIG. 12A, a focusing ring 1201 on the infrared apochromatic lens is used for manual rotation to achieve lens focusing. As shown in FIG. 12B, a liquid lens 1202 is additionally installed on the infrared apochromatic lens, so as to perform focal plane search in combination with the electronic device, thereby realizing automatic focusing of the lens.

In some embodiments, the electronic device further includes: a diaphragm, disposed inside the housing and configured to protect the photosensitive chip and the processor. The type of the diaphragm includes at least one of the following: a long-pass filter, a polarizer, and an attenuator.

As shown in FIG. 4, the electronic device 40 includes a diaphragm 45. A diaphragm 903 may be a long-pass filter (for example, an infrared long-pass filter) for filtering out visible light, a polarizer for acquiring polarized light, or an attenuator for attenuating incident light, or the like.

In some embodiments, the electronic device further includes: a light source apparatus, disposed inside the housing and configured to provide at least one light source, the type of light source including at least one of the following: a wide-band light source and a narrow-band light source. An illumination mode of the light source apparatus includes at least one of the following: an always-on mode and a flashlight mode.

As shown in FIG. 4, a light source provided by a light source apparatus 46 may be a wide-band light source or multiple narrow-band light sources turned on simultaneously. Since the electronic device in some embodiments of the disclosure use a narrow-band filter, it is not necessary to separately turn on light sources of different wavelengths for photographing to obtain multi-spectral information, but all light source apparatuses are turned on at the same time or a wide-band light source is directly used for illumination, and then a multi-spectral image is obtained by filtering according to a narrow-band filter matrix.

For example, the illumination mode of the light source apparatus is an always-on mode. The brightness of the always-on mode may be kept constant over a long period of time, and is suitable for real-time observation of samples and recording of videos. The illumination mode of the light source apparatus is a flashlight mode. The flashlight mode may burst a great light source power in a very short time, and is suitable for acquiring a motion sample, or is suitable for a scene with a relatively strong ambient light. In the flashlight mode, the camera only needs to select a very small shutter time (about $1/100000$ seconds (s)), thereby ensuring that an image without motion blur may be acquired.

Figure 5A:
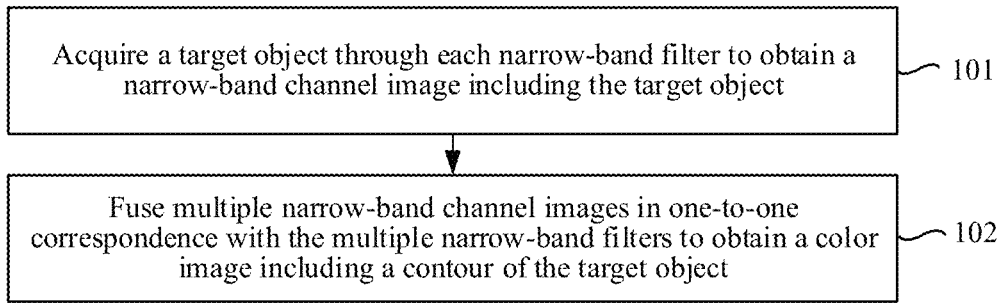
FIG. 5A and FIG. 5B are schematic flowcharts of an image processing method according to some embodiments of the disclosure.

As previously described, the image processing method provided in some embodiments of the disclosure may be implemented by an electronic device. The electronic device includes multiple narrow-band filters. Reference is made to FIG. 5A. FIG. 5A is a schematic flowchart of an image processing method according to some embodiments of the disclosure. The flow is described with steps shown in FIG. 5A.

The electronic device may be any electronic device having an imaging function, for example, a smartphone, a camera, or the like. The narrow-band filter is an optical filter subdivided from a band-pass optical filter. The narrow-band optical filter allows an optical signal to pass in a specific band, while optical signals on both sides deviating from the band are blocked, for example, a 980 nm narrow-band optical filter, a 1000 nm narrow-band optical filter, a 1050 nm narrow-band optical filter, a 1064 nm narrow-band optical filter, and a 1080 nm narrow-band optical filter.

In step 101, a target object may be acquired through each narrow-band filter to obtain a narrow-band channel image including the target object.

For example, the target object may be acquired through the narrow-band filter to obtain a narrow-band channel image, which can well distinguish the target object from other non-target objects so as to fully and effectively display the target object.

In some embodiments, the electronic device includes a photosensitive chip. The multiple narrow-band filters are regularly arranged on the photosensitive chip in a matrix form. Step 101 of acquiring a target object through each narrow-band filter to obtain a narrow-band channel image including the target object may be implemented by the following technical solution: performing image acquisition processing on the target object through the photosensitive chip to obtain an image including the target object; performing channel splitting processing on the image including the target object based on each of the narrow-band filters in the photosensitive chip to obtain an intermediate channel image corresponding to each of the narrow-band filters; and interpolating the intermediate channel image corresponding to each of the narrow-band filters to obtain the narrow-band channel image corresponding to each of the narrow-band filters. The narrow-band channel image corresponding to each narrow-band filter may be accurately obtained by some embodiments of the disclosure.

As shown in FIG. 6, a filter matrix includes multiple narrow-band filters (a 1450 nm narrow-band filter, a 1300 nm narrow-band filter, and a 1050 nm narrow-band filter shown in FIG. 6). The filter matrix may be repeatedly arranged on the photosensitive chip in a 2*2 period for acquiring narrow-band channel images regularly arranged.

By way of example, as shown in FIG. 8, a customized filter matrix 801 includes multiple narrow-band filters (a 1450 nm narrow-band filter 802, a 1300 nm narrow-band filter 803, a 1050 nm narrow-band filter 804, and a wide-band filter 806). The 1450 nm narrow-band filter 802 is taken as an example. A pixel corresponding to a 1450 nm channel covered by the 1450 nm narrow-band filter 802 from the image including the target object may be extracted as a pixel corresponding to the 1450 nm filter. Based on the arrangement of the 1450 nm narrow-band filter on the photosensitive chip, the pixels of the 1450 nm narrow-band filter are arranged to obtain an intermediate channel image corresponding to the 1450 nm filter. For example, when the 1450 nm narrow-band filter may be arranged at (0, 2), (0, 4), (0, 6), and (0, 8) on the photosensitive chip, and the extracted pixels are arranged at (0, 2), (0, 4), (0, 6), and (0, 8) to obtain an intermediate channel image 805 corresponding to the 1450 nm filter.

By way of example, referring to FIG. 8, the 1450 nm narrow-band filter is also taken as an example. Null pixels in the intermediate channel image 805 are interpolated, namely, pixel values are assigned to the null pixels. The assigned pixel values are pixel values of non-null pixels in the intermediate channel image 805.

For example, the 1450 nm narrow-band filter, the 1300 nm narrow-band filter, and the 1050 nm narrow-band filter are taken as an example. For the acquired image including the target object, pixels covered by the 1450 nm filter are extracted from the image including the target object as pixels corresponding to the 1450 nm filter. Based on the arrangement of the narrow-band filter on the photosensitive chip, the pixels of the narrow-band filter are arranged to obtain an intermediate channel image corresponding to the 1450 nm filter, and the 1450 nm intermediate channel image is interpolated to obtain a 1450 nm narrow-band channel image (namely, a narrow-band channel image with a light transmission wavelength of 1450 nm). Pixels covered by the 1300 nm filter are extracted from the image including the target object as pixels corresponding to the 1300 nm filter. Based on the arrangement of the narrow-band filter on the photosensitive chip, the pixels of the narrow-band filter are arranged to obtain an intermediate channel image corresponding to the 1300 nm filter, and the 1300 nm intermediate channel image is interpolated to obtain a 1300 nm narrow-band channel image (namely, a narrow-band channel image with a light transmission wavelength of 1300 nm). Pixels covered by the 1050 nm filter are extracted from the image including the target object as pixels corresponding to the 1050 nm filter. Based on the arrangement of the narrow-band filter on the photosensitive chip, the pixels of the narrow-band filter are arranged to obtain an intermediate channel image corresponding to the 1050 nm filter, and the 1050 nm intermediate channel image is interpolated to obtain a 1050 nm narrow-band channel image (namely, a narrow-band channel image with a light transmission wavelength of 1050 nm).

In some embodiments, the foregoing operation of performing channel splitting processing on the image including the target object based on each of the narrow-band filters in the photosensitive chip to obtain an intermediate channel image corresponding to each of the narrow-band filters may be implemented through the following technical solution: performing the following processing on any one of the narrow-band filters in the photosensitive chip: determining a position of the narrow-band filter in the photosensitive chip; performing pixel extraction processing on the image including the target object based on the position of the narrow-band filter in the photosensitive chip to obtain pixels of the narrow-band filter; and arranging the pixels of the narrow-band filter based on arrangement of the narrow-band filter in the photosensitive chip to obtain the intermediate channel image corresponding to the narrow-band filter. Through some embodiments of the disclosure, the pixels of the narrow-band filter may be arranged using arrangement of the narrow-band filter in the photosensitive chip, so as to obtain an accurate intermediate channel image.

By way of example, the foregoing operation of performing pixel extraction processing on the image including the target object based on the position of the narrow-band filter in the photosensitive chip to obtain pixels of the narrow-band filter may be implemented by the following technical solution: performing pixel extraction processing of corresponding channel on the image including the target object based on the position of the narrow-band filter in the photosensitive chip to obtain pixels of the narrow-band filter, where the channel may be a channel corresponding to the narrow-band filter to realize channel splitting.

By way of example, as shown in FIG. 8, a customized filter matrix 801 includes multiple narrow-band filters (a 1450 nm narrow-band filter 802, a 1300 nm narrow-band filter 803, a 1050 nm narrow-band filter 804, and a wide-band filter 806). The 1450 nm narrow-band filter 802 is taken as an example. A pixel corresponding to a 1450 nm channel covered by the 1450 nm narrow-band filter 802 from the image including the target object is extracted as a pixel corresponding to the 1450 nm filter. Based on the arrangement of the 1450 nm narrow-band filter on the photosensitive chip, the pixels of the 1450 nm narrow-band filter are arranged to obtain an intermediate channel image corresponding to the 1450 nm filter. For example, when the 1450 nm narrow-band filter is arranged at (0, 2), (0, 4), (0, 6), and (0, 8) on the photosensitive chip, and the extracted pixels are arranged at (0, 2), (0, 4), (0, 6), and (0, 8) to obtain an intermediate channel image 805 corresponding to the 1450 nm filter.

For example, the 1450 nm narrow-band filter, the 1300 nm narrow-band filter, and the 1050 nm narrow-band filter are taken as an example. Pixels of the image including the target object are extracted at the position of the narrow-band filter on the photosensitive chip to obtain pixels of the narrow-band filter, and the pixels of the narrow-band filter are arranged according to the arrangement of the narrow-band filter on the photosensitive chip to obtain an intermediate channel image corresponding to the narrow-band filter, namely, a narrow-band channel image with a light transmission wavelength of 1450 nm, a narrow-band channel image with a light transmission wavelength of 1300 nm, and a narrow-band channel image with a light transmission wavelength of 1050 nm.

In step 102, multiple narrow-band channel images in one-to-one correspondence with the multiple narrow-band filters are fused to obtain a color image including a contour of the target object.

For example, after obtaining the narrow-band channel images corresponding to the multiple narrow-band filters, the narrow-band channel images corresponding to the multiple narrow-band filters are synthesized to obtain a color image, whereby the target object and non-target objects in the color image are clearly defined by the color image acquired by an electronic device, so as to fully and effectively display the target object and improve an imaging effect of an image.

In some embodiments, the multiple narrow-band channel images in one-to-one correspondence with the multiple narrow-band filters have the same size. The operation of fusing multiple narrow-band channel images in one-to-one correspondence with the multiple narrow-band filters to obtain a color image including a contour of the target object may be implemented by the following technical solution: performing the following processing on any pixel in the image including the target object: determining a pixel value of the pixel corresponding to each of the multiple narrow-band channel images; synthesizing the pixel values of the pixels corresponding to the multiple narrow-band channel images to obtain multi-channel pixel values of the pixels; and stitching the multi-channel pixel values of the multiple pixels to obtain the color image including the contour of the target object. Through some embodiments of the disclosure, it is possible to synthesize from the pixel dimension to obtain a color image having an accurate imaging effect.

By way of example, with continued reference to FIG. 8, the multiple narrow-band channel images have the same size. The multiple narrow-band channel images are obtained by performing channel splitting processing on an image (original image) including a target object, namely, the size of the multiple narrow-band channel images is the same as the size of the original image. For example, any pixel may be a pixel at (0, 0) in the original image. Pixel values of pixels at (0, 0) corresponding to the multiple narrow-band channel images are determined, and multiple pixel values are determined equivalently. The synthesis processing may be: averaging the multiple pixel values, and taking an average result as multi-channel pixel values of the pixels at (0, 0) corresponding to the multiple narrow-band channel images. Based on the foregoing method, the multi-channel pixel values of the pixels corresponding to (0, 1) may be obtained, and the multi-channel pixel values of the pixels corresponding to all positions in the original image are stitched to obtain a final color image.

For example, a 1450 nm narrow-band filter, a 1300 nm narrow-band filter, and a 1050 nm narrow-band filter are taken as an example. The narrow-band channel image includes a narrow-band channel image with a light transmission wavelength of 1450 nm, a narrow-band channel image with a light transmission wavelength of 1300 nm, and a narrow-band channel image with a light transmission wavelength of 1050 nm. The sizes of the narrow-band channel image with the light transmission wavelength of 1450 nm, the narrow-band channel image with the light transmission wavelength of 1300 nm, and the narrow-band channel image with the light transmission wavelength of 1050 nm are the same. A pixel value of any pixel corresponding to the narrow-band channel images corresponding to the multiple narrow-band filters is determined. The pixel values of the multiple pixels are synthesized to obtain multi-channel pixel values of any pixel. The multi-channel pixel values of the pixels are stitched according to the positions of the pixels to obtain a color image including the contour of the target object, thereby synthesizing the narrow-band channel image with the light transmission wavelength of 1450 nm, the narrow-band channel image with the light transmission wavelength of 1300 nm, and the narrow-band channel image with the light transmission wavelength of 1050 nm into the color image.

In some embodiments, the operation of fusing multiple narrow-band channel images in one-to-one correspondence with the multiple narrow-band filters to obtain a color image including a contour of the target object may be implemented by the following technical solution: determining partial narrow-band filters from the multiple narrow-band filters; and fusing narrow-band channel images corresponding to the partial narrow-band filters to obtain the color image including the contour of the target object. Some embodiments of the disclosure can improve an imaging effect of the color image.

For example, the color images synthesized by all the narrow-band channel images corresponding to the narrow-band filters do not necessarily have a good imaging effect. Only the narrow-band channel images corresponding to the partial narrow-band filters may be synthesized in some embodiments of the disclosure to obtain a color image with the best imaging effect.

In some embodiments, the foregoing operation of determining partial narrow-band filters from the multiple narrow-band filters may be implemented by the following technical solution: displaying filtering indexes of the multiple narrow-band filters; and taking, in response to a selection operation for the filtering indexes, narrow-band filters corresponding to selected filtering indexes as the partial narrow-band filters.

For example, filtering indexes of the multiple narrow-band filters are displayed, for example, 980 nm, 1000 nm, 1050 nm, 1064 nm, 1050 nm, 1080 nm, 1300 nm, and 1450 nm. Any three filtering indexes are manually selected, for example, 1050 nm, 1300 nm, and 1450 nm. The narrow-band filters corresponding to 1050 nm, 1300 nm, and 1450 nm are taken as partial narrow-band filters, and the narrow-band channel images corresponding to the 1050 nm narrow-band filter, the 1300 nm narrow-band filter, and the 1450 nm narrow-band filter are synthesized to obtain a color image, so as to synthesize a color image meeting user requirements based on the user selection.

In some embodiments, the foregoing operation of determining partial narrow-band filters from the multiple narrow-band filters may be implemented by the following technical solution: obtaining frequencies in which the multiple narrow-band filters are used; and sorting the multiple narrow-band filters in descending order based on the frequencies in which the multiple narrow-band filters are used, and taking multiple narrow-band filters ranked first in a descending sorting result as the partial narrow-band filters.

For example, frequencies in which the multiple narrow-band filters are used are obtained, the multiple narrow-band filters are sorted in descending order based on the frequencies in which the multiple narrow-band filters are used, and three narrow-band filters ranked first in a descending sorting result are taken as the partial narrow-band filters. For example, a 1050 nm narrow-band filter, a 1300 nm narrow-band filter, and a 1450 nm narrow-band filter are the three narrow-band filters ranked first in the descending sorting result. Then, narrow-band filters corresponding to 1050 nm, 1300 nm, and 1450 nm are taken as the partial narrow-band filters, and narrow-band channel images corresponding to the 1050 nm narrow-band filter, the 1300 nm narrow-band filter, and the 1450 nm narrow-band filter are synthesized to obtain a color image, whereby a color image meeting the user requirements may be automatically synthesized based on the user preference.

In some embodiments, the operation of fusing, in response to at least four narrow-band filters, multiple narrow-band channel images in one-to-one correspondence with the multiple narrow-band filters to obtain a color image including a contour of the target object may be implemented by the following technical solution: determining any three narrow-band filters from the multiple narrow-band filters; synthesizing narrow-band channel images corresponding to the any three narrow-band filters to obtain candidate color images; performing edge detection processing on each of the candidate color images to obtain edge features of each of the candidate color images; and taking a candidate color image with the most edge features as the color image including the contour of the target object.

For example, since there are many schemes for synthesizing narrow-band channel images, it may be too cumbersome to manually synthesize the narrow-band channel images one by one. In order to improve the synthesis efficiency, in some embodiments of the disclosure, narrow-band channel images corresponding to any three narrow-band filters may be synthesized to obtain candidate color images, and edge detection processing may be performed on all the candidate color images to obtain edge features of each candidate color image. Since the candidate color images having more edge features have more prominent edges and better imaging effects, the candidate color image having most edge features may be taken as the color image including the contour of the target object.

Edge detection may be used for detecting pixel points in an image where the brightness change is obvious (namely, pixel points where the brightness change exceeds a change threshold), and a set of pixel points represents a contour (namely, an edge). Image edge detection can greatly reduce the data volume, and eliminate irrelevant information to preserve important structural attributes (namely, edges) of the image. The edge detection processing in some embodiments of the disclosure may use a first-order differential edge operator, a Roberts edge detection operator, a Prewitt edge detection operator, a second-order differential operator, and the like.

Figure 5B:
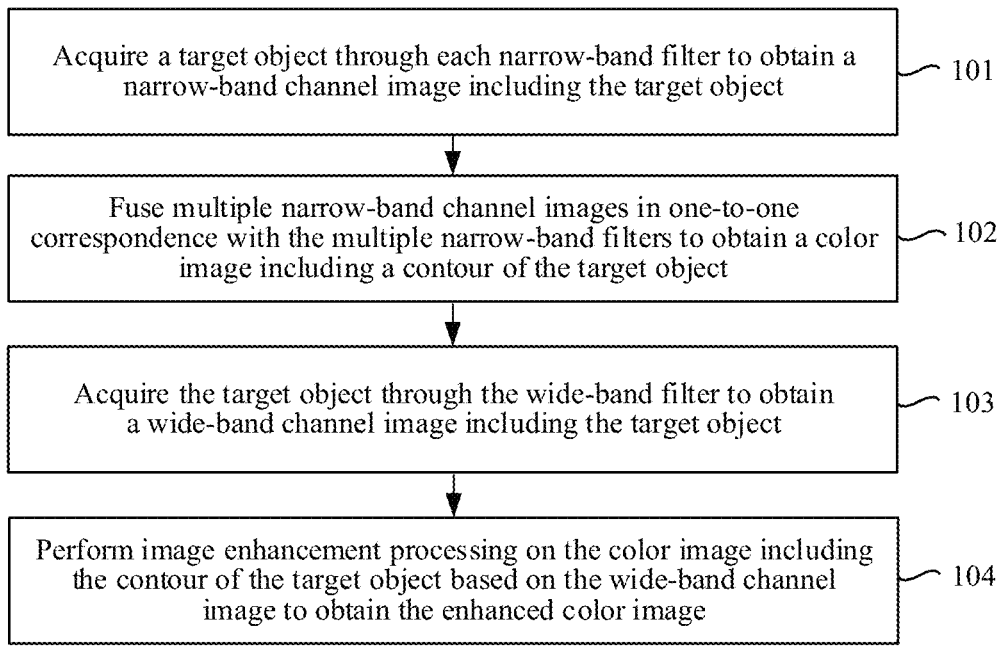

Referring to FIG. 5B, FIG. 5B is a schematic flowchart of an image processing method according to some embodiments of the disclosure. In FIG. 5B, FIG. 5A further includes step 103 and step 104. The electronic device further includes a wide-band filter. In step 103, a target object is acquired through narrow-band filters to obtain a wide-band channel image including the target object. In step 105, image enhancement processing is performed on the color image including the contour of the target object based on the wide-band channel image to obtain the enhanced color image.

As shown in FIG. 6, a filter matrix includes multiple narrow-band filters (a 1450 nm narrow-band filter, a 1300 nm narrow-band filter, and a 1050 nm narrow-band filter shown in FIG. 6) and a wide-band filter 604. The filter matrix is repeatedly arranged on a photosensitive chip 602 in a 2*2 period. The narrow-band channel image includes a narrow-band channel image with a light transmission wavelength of 1450 nm, a narrow-band channel image with a light transmission wavelength of 1300 nm, and a narrow-band channel image with a light transmission wavelength of 1050 nm. The sizes of the narrow-band channel image with the light transmission wavelength of 1450 nm, the narrow-band channel image with the light transmission wavelength of 1300 nm, and the narrow-band channel image with the light transmission wavelength of 1050 nm are the same. The narrow-band channel image with the light transmission wavelength of 1450 nm, the narrow-band channel image with the light transmission wavelength of 1300 nm, and the narrow-band channel image with the light transmission wavelength of 1050 nm are synthesized into a color image, and the sizes of the synthesized color image and the wide-band channel images are the same. A pixel value of any pixel corresponding to the color image and a pixel value of any pixel corresponding to the wide-band channel images are determined. The ratio of the pixel value of any pixel corresponding to the color image and the pixel value of any pixel corresponding to the wide-band channel images is taken as an enhancement value of any pixel. The enhancement values of the pixels are stitched according to the positions of the pixels to obtain the enhanced color image.

In some embodiments, in an auxiliary pathological sampling imaging scene, a pathological tissue may be acquired through each narrow-band filter to obtain a narrow-band channel pathological image including the pathological tissue. Multiple narrow-band channel pathological images in one-to-one correspondence with the multiple narrow-band filters are fused to obtain a color pathological image including a contour of the pathological tissue, so as to assist intraoperative residual lesion detection and postoperative pathological sampling through the color pathological image, improve the success rate of surgery and the accuracy and consistency of postoperative pathological sampling, and reduce the difficulty of pathological sampling.

An exemplary application of some embodiments of the disclosure in an actual application scene will be described below.

Some embodiments of the disclosure may be applied to various imaging scenes. For example, a pathological tissue may be imaged with an electronic device in an auxiliary pathological sampling imaging scene, intraoperative residual lesion detection and postoperative pathological sampling are assisted by a formed image.

The following uses the auxiliary pathological sampling imaging scene as an example for description.

In the related art, the main basis for the doctor to perform intraoperative tumor lesion edge detection and postoperative pathological materials selection is mainly divided into two aspects: For hospitals with limited medical conditions, the doctor mainly distinguishes a tumor region through naked eye observation and touch hand feeling for tissue block selection. The method is a very difficult task for inexperienced doctors. Especially in the case of a hidden tumor bed, it is impossible to identify a normal tissue region and a lesion region by pathologist's vision, and the touch hand feeling is very subjective. In the other aspect, a radiologic image method is used for distinguishing the lesion region and assisting pathological sampling, such as an optical imaging platform. The platform may give an X-ray transmission image of the resected tissue, assist the doctor in finding the lesion more accurately during the surgery, and also assist in the pathological sampling in a biopsy procedure. However, the interpretation of X-ray image mainly depends on the experience of the doctor. There is certain subjectivity, and different doctors sometimes have objection in interpretation structures. In addition, an X-ray device is expensive.

In order to solve the foregoing problems, in some embodiments of the disclosure, a short-wave infrared camera (also referred to as a narrow-band infrared color camera, which may be implemented by an electronic device) made of a mosaic photosensitive chip on chip customized by a narrow-band filter is used for assisting in intraoperative residual lesion detection and postoperative pathological sampling. The snapshot-type auxiliary sampling system does not need to perform image registration at different wavelengths, can achieve high-speed real-time imaging without blocking ambient light, and can work in an open manner very conveniently. A flash photographing mode can eliminate motion blur and further reduce the influence of ambient light. Some embodiments of the disclosure can also improve the success rate of surgery and the accuracy and consistency of postoperative pathological sampling, reduce the difficulty of pathological sampling, and lower the hardware cost compared with a radiological imaging system.

As shown in FIG. 6, some embodiments of the disclosure propose to perform a customized patch 602 on a short-wave infrared camera 601 (a photosensitive chip on the short-wave infrared camera chip is patched with a filter matrix), and the patched filter matrix is a 2*2 periodically repeated filter matrix 603. Each 2*2 filter matrix includes: a 1450 nm narrow-band filter, a 1300 nm narrow-band filter, a 1050 nm narrow-band filter, and a wide-band filter. The wide-band filter is ordinary glass or other similar materials which are fully transparent in the short-wave infrared band or have a brightness attenuation function. The first three narrow-band filters (1450 nm narrow-band filter, 1300 nm narrow-band filter, and 1050 nm narrow-band filter) may be used for synthesizing three channels of infrared color, while the wide-band filter may output a gray narrow-band channel image without a narrow-band filtering effect.

As shown in FIG. 6, the short-wave infrared photosensitive chip is patched with mosaic matrices. The mosaic matrices are in units of 2*2. Each 2*2 filter matrix has four small rectangular units. The three units are 1450 nm, 1300 nm, and 1050 nm narrow-band filters. The fourth unit is ordinary glass or a window having a brightness attenuation function for providing an ordinary grayscale image. The size of each unit may be the same as the pixel size of the patched photosensitive chip, and when patched, one-to-one correspondence is ensured. The three narrow-band filters in the 2*2 filter matrix in FIG. 6 are 1050 nm, 1300 nm, and 1450 nm. In practical use, the narrow-band bands may also be replaced. The three bands (1050 nm, 1300 nm, and 1450 nm) here are only three empirical bands which are effective for auxiliary sampling.

The size of each filter may be consistent with the size of the pixels on the photosensitive chip. For example, if the side length of the pixels on the photosensitive chip is 5 microns, the side length of each filter cell in FIG. 6 may be 5 microns. If the side length of the pixels on the photosensitive chip is 8 microns, the side length of each filter cell in FIG. 6 may be 8 microns, so as to ensure that there is a filter on each pixel. For each frame of acquired image, pixels covered by the 1450 nm filter are extracted to obtain a narrow-band channel image with a light transmission wavelength of 1450 nm, pixels covered by the 1300 nm filter are extracted to obtain a narrow-band channel image with a light transmission wavelength of 1300 nm, and pixels covered by the 1050 nm filter are extracted to obtain a narrow-band channel image with a light transmission wavelength of 1050 nm.

Figure 7:
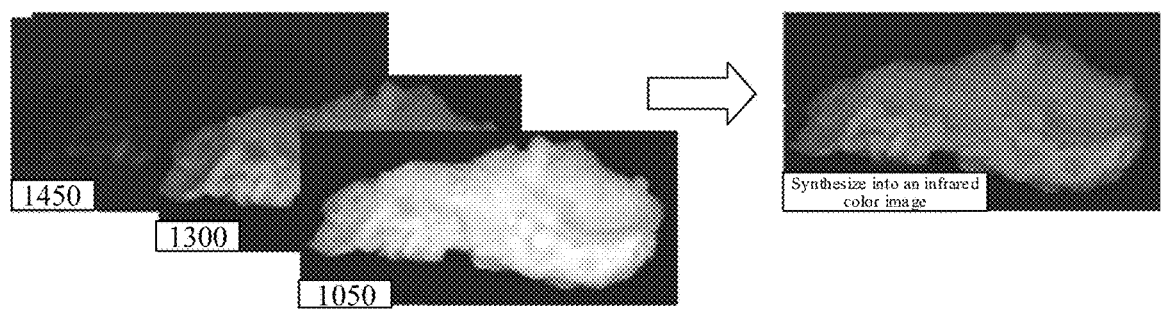
FIG. 7 is a schematic diagram of a synthetic color image according to some embodiments of the disclosure.

As shown in FIG. 7, the narrow-band channel images of the three channels may be directly synthesized into a color image. In addition, the corresponding pixels of all the wide-band filters are extracted to obtain a grayscale image for acquiring an image without wavelength difference and, certainly, for acquiring an image of a specific band through the selection of an external illumination light source.

As shown in FIG. 8, each frame of acquired image is subjected to channel splitting through the narrow-band filters of 1050 nm, 1300 nm, and 1450 nm, and interpolated after the channel splitting to obtain a narrow-band channel image with a light transmission wavelength of 1450 nm, a narrow-band channel image with a light transmission wavelength of 1300 nm, and a narrow-band channel image with a light transmission wavelength of 1050 nm. The narrow-band channel image with the light transmission wavelength of 1450 nm, the narrow-band channel image with the light transmission wavelength of 1300 nm, and the narrow-band channel image with the light transmission wavelength of 1050 nm are synthesized into a narrow-band infrared color image.

The snapshot-type short-wave infrared camera shown in some embodiments of the disclosure may capture a narrow-band infrared color image in real time, while the current multi-spectral system and hyper-spectral system are difficult to be real-time.

FIG. 9A shows a support-type imaging system. The support-type imaging system includes a customized short-wave infrared camera 901 (such as a customized photosensitive chip shown in FIG. 6), an infrared apochromatic lens 902, a diaphragm 903, and a support 904. The infrared apochromatic lens 902 may ensure that several narrow-band wavelengths can be clearly focused on the surface of the photosensitive chip at the same time. The diaphragm 903 may be an infrared long-pass filter for filtering out visible light, a polarizer for obtaining polarized light, or an attenuator for attenuating incident light, or the like.

FIG. 9B shows a handheld imaging system. The handheld imaging system includes a customized short-wave infrared camera 901 (such as a customized photosensitive chip shown in FIG. 6), an infrared apochromatic lens 902, a diaphragm 903, and a handle 905. The infrared apochromatic lens 902 may ensure that several narrow-band wavelengths can be clearly focused on the surface of the photosensitive chip at the same time. The diaphragm 903 may be an infrared long-pass filter for filtering out visible light, a polarizer for obtaining polarized light, or an attenuator for attenuating incident light, or the like.

The lens in FIG. 9A and FIG. 9B may be an ordinary lens or an infrared apochromatic lens. The image definition will be affected to a certain extent due to different refractive indexes of different wavelengths when using the ordinary lens, while the definition problem can be solved when using the infrared apochromatic lens. The infrared apochromatic lens enables different wavelengths of light to converge to the same plane through coating and material processes, whereby the image definition is higher.

Figure 10A:
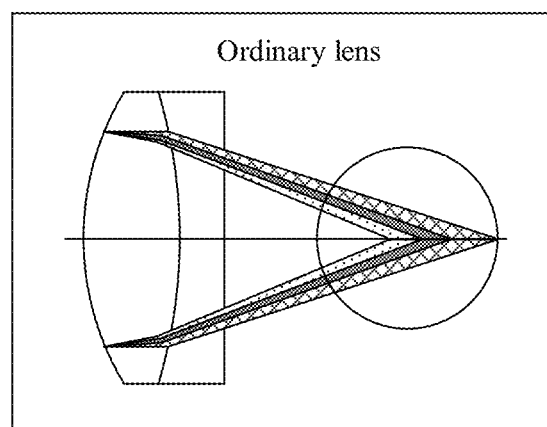
FIG. 10A is a schematic diagram of an ordinary lens according to some embodiments of the disclosure.
Figure 10B:
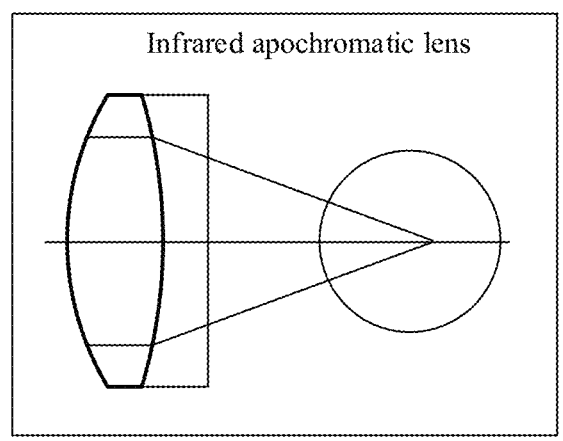
FIG. 10B is a schematic diagram of an infrared apochromatic lens according to some embodiments of the disclosure.

Light of different wavelengths may converge to different planes after passing through the ordinary lens shown in FIG. 10A due to different refractive indexes of the light of different wavelengths, whereby the image of one wavelength is clear, while the image of the other wavelength is blurred. The infrared apochromatic lens as shown in FIG. 10B enables light with a certain range of wavelengths (for example, 400-1700 nm) to converge to a plane due to the coating of the lens and the selection of materials and manufacturing processes, whereby the chromatic aberration caused by the ordinary lens can be avoided.

The light source displayed in FIG. 9A and FIG. 9B may be a wide-band light source or multiple narrow-band light sources turned on simultaneously. With the snapshot-type short-wave infrared camera in FIG. 6, it is not necessary to separately turn on light sources of different wavelengths for photographing to obtain multi-spectral information. But all light sources are turned on at the same time or a wide-band light source is directly used for illumination, and then a multi-spectral image may be obtained by filtering according to a filter matrix.

Figure 11A:
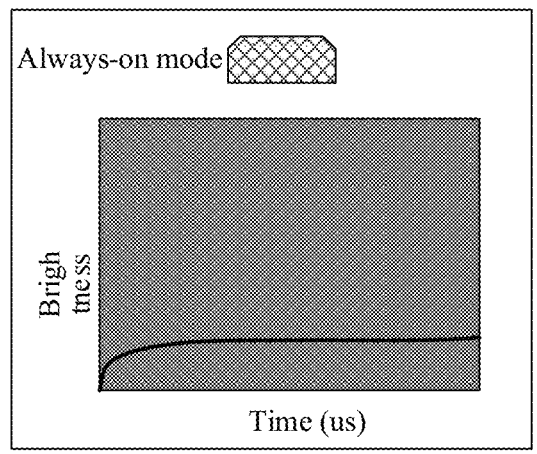
FIG. 11A is a schematic diagram of an always-on mode according to some embodiments of the disclosure.
Figure 11B:
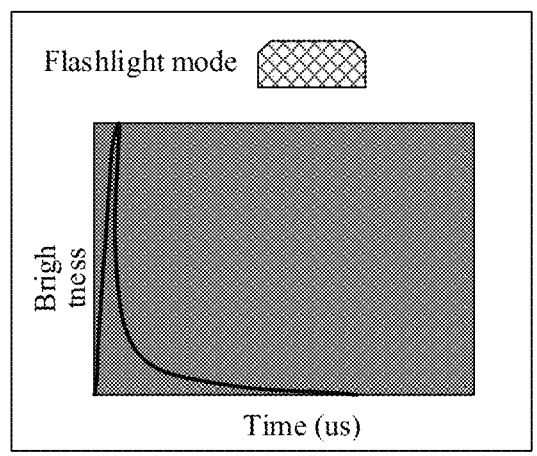
FIG. 11B is a schematic diagram of a flashlight mode according to some embodiments of the disclosure.

FIG. 11A shows an always-on mode (illumination mode of light source). The brightness of the always-on mode may be kept constant over a long period of time, and may be suitable for real-time observation of samples and recording of videos. FIG. 11B shows a flashlight mode (illumination mode of light source). The flashlight mode may burst a great light source power in a very short time, and may be suitable for acquiring a motion sample, or may be suitable for a scene with a relatively strong ambient light. In the flashlight mode, the camera only needs to select a very small shutter time (about $\frac{1}{100000}$ seconds (s)), thereby ensuring that a sample image without motion blur may be acquired.

As shown in FIG. 12A, a focusing ring 1201 on the infrared apochromatic lens may be used for manual rotation to achieve lens focusing. As shown in FIG. 12B, a liquid lens 1202 may be additionally installed on the infrared apochromatic lens, so as to perform focal plane search in combination with the camera, thereby realizing automatic focusing of the lens.

Figure 13:
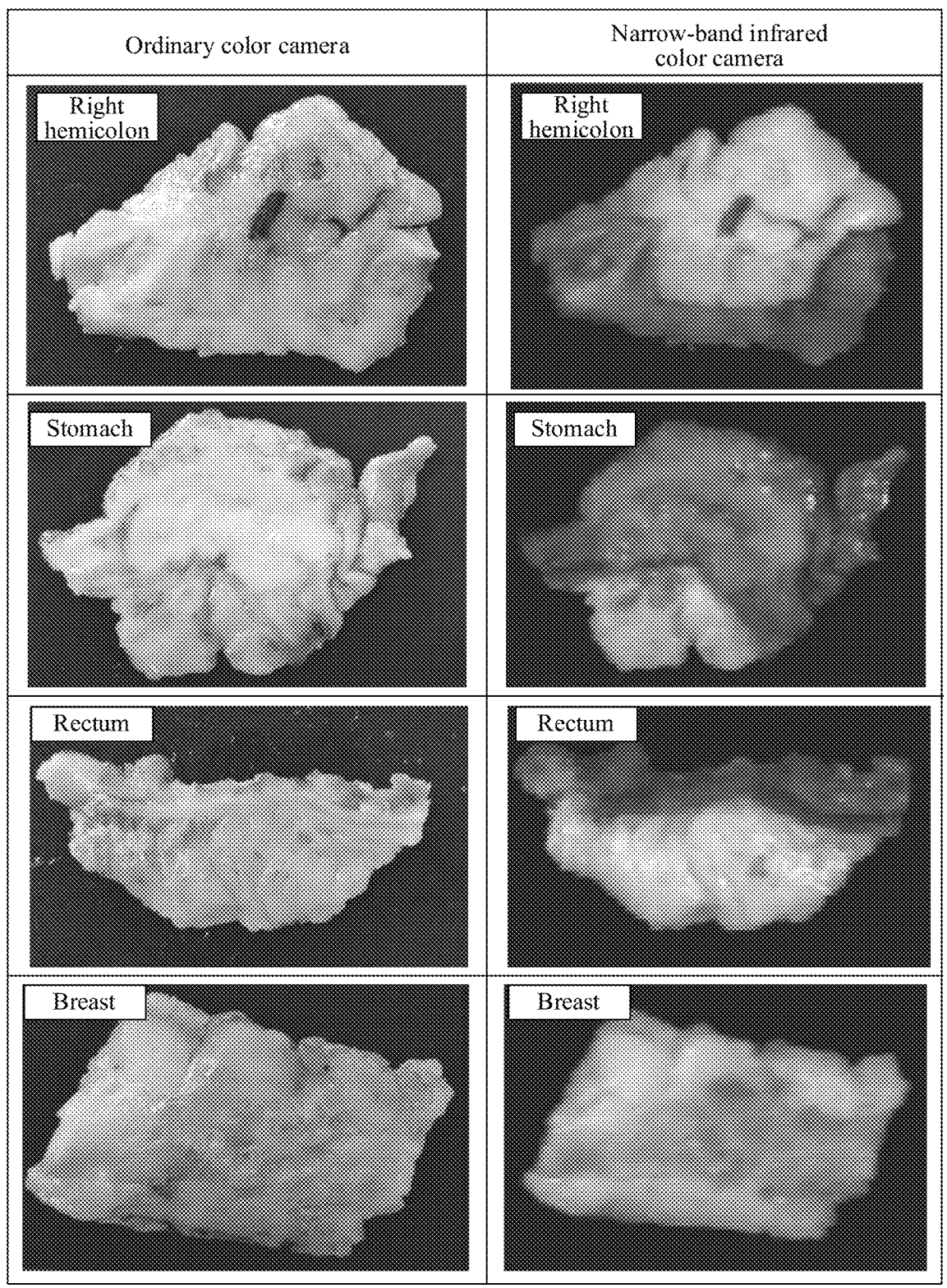
FIG. 13 is a schematic diagram of a synthetic infrared color image captured by a narrow-band infrared color camera compared with a color image captured by an ordinary color camera.

FIG. 13 shows a diagram of a synthetic infrared color image captured by a narrow-band infrared color camera compared with a color image captured by an ordinary color camera. The hollow organ tissues mainly include: colon cancer tissues, rectal cancer tissues, gastric cancer tissues, and esophageal cancer tissues. In the foregoing different tumor tissues, narrow-band infrared color images have better tissue boundary discrimination and similar imaging colors, thereby showing greater advantages in the identification of hollow organ muscular layers. The narrow-band infrared color images are obviously clearer than ordinary color images when determining tumor boundaries. A color image synthesized by 1050 nm, 1300 nm, and 1450 nm can clearly display the range of tumor tissues. Different tissues present colors with different intensities from yellow to orange. In breast cases, the narrow-band infrared color images more clearly display tumor contours and tumor tissues than the ordinary color images. The contour displayed has the highest degree of coincidence with full-field digital pathological sections (whole slide image (WSI)).

In summary, the technical solution provided by some embodiments of the disclosure use an infrared multi-spectral narrow-band synthetic color image to provide doctors with information which cannot be observed by naked eyes to predict resected tissue lesion regions, and a new solution is provided for intraoperative tumor edge determination and postoperative auxiliary pathological sampling. Compared with the methods of naked eye observation and hand touch by doctors, this method is more reliable and consistent. The system of some embodiments of the disclosure is a snapshot-type imaging system, which can achieve real-time imaging (for example, 120 frames per second (fps)), directly solve the problem of image registration between different spectra, and save time. In addition, another advantage of a narrow-band filter matrix is to well filter the influence of an indoor light source, and ensure the purity of the spectra, so as to enable a doctor to work in an open space, without a light shading box and environmental constraints. The design of a flashlight can further eliminate the influence of ambient light (at short exposures) and have great advantages for taking motion samples (for example, human breathing or jitter-induced motion). On the other hand, the imaging system is non-invasive, non-contact, and free from ionizing radiation, can be easily used in an open space with little influence from ambient light, and has the hardware system cost lower than the radiation system cost. The imaging system of some embodiments of the disclosure can provide sampling doctors with more information of tumor beds and thus improve the efficiency of sampling, as it is more helpful to sampling of postoperative resected formalin-fixed tumor tissues than ordinary color images.

The image processing method provided in some embodiments of the disclosure has thus far been described in connection with exemplary applications and implementations of the electronic device provided in some embodiments of the disclosure. Next, a scheme in which various modules in an image processing apparatus according to some embodiments of the disclosure cooperate to perform image processing will be continued.

An acquisition module 5551 may be configured to acquire a target object through multiple narrow-band filters to obtain a narrow-band channel image including the target object. A fusion module 5552 may be configured to fuse multiple narrow-band channel images in one-to-one correspondence with the multiple narrow-band filters to obtain a color image including a contour of the target object.

In some embodiments, the image processing apparatus includes a photosensitive chip. The multiple narrow-band filters are regularly arranged on the photosensitive chip in a matrix form. The acquisition module 5551 may be further configured to: perform image acquisition processing on the target object through the photosensitive chip to obtain an image including the target object; perform channel splitting processing on the image including the target object based on each of the narrow-band filters in the photosensitive chip to obtain an intermediate channel image corresponding to each of the narrow-band filters; and interpolate the intermediate channel image corresponding to each of the narrow-band filters to obtain the narrow-band channel image corresponding to each of the narrow-band filters.

In some embodiments, the acquisition module 5551 may be further configured to perform the following processing on any one of the narrow-band filters in the photosensitive chip: determining a position of the narrow-band filter in the photosensitive chip; performing pixel extraction processing on the image including the target object based on the position of the narrow-band filter in the photosensitive chip to obtain pixels of the narrow-band filter; and arranging the pixels of the narrow-band filter based on arrangement of the narrow-band filter in the photosensitive chip to obtain the intermediate channel image corresponding to the narrow-band filter.

In some embodiments, the multiple narrow-band channel images in one-to-one correspondence with the multiple narrow-band filters have the same size. The fusion module 5552 may be further configured to perform the following processing on any pixel in the narrow-band channel images: determining a pixel value of the pixel corresponding to each of the multiple narrow-band channel images; synthesizing multiple pixel values of the pixels to obtain multi-channel pixel values of the pixels; and stitching the multi-channel pixel values of the multiple pixels to obtain the color image including the contour of the target object.

In some embodiments, the fusion module 5552 may be further configured to: determine partial narrow-band filters from the multiple narrow-band filters; and fuse narrow-band channel images corresponding to the partial narrow-band filters to obtain the color image including the contour of the target object.

In some embodiments, the fusion module 5552 may be further configured to: display filtering indexes of the multiple narrow-band filters; and take, in response to a selection operation for the filtering indexes, narrow-band filters corresponding to selected filtering indexes as the partial narrow-band filters.

In some embodiments, the fusion module 5552 may be further configured to: obtain frequencies in which the multiple narrow-band filters are used; and sort the multiple narrow-band filters in descending order based on the frequencies in which the multiple narrow-band filters are used, and take multiple narrow-band filters ranked first in a descending sorting result as the partial narrow-band filters.

In some embodiments, in response to at least four narrow-band filters, the fusion module 5552 may be further configured to: determine any three narrow-band filters from the multiple narrow-band filters; synthesize narrow-band channel images corresponding to the any three narrow-band filters to obtain candidate color images; perform edge detection processing on each of the candidate color images to obtain edge features of each of the candidate color images; and take a candidate color image with the most edge features as the color image including the contour of the target object.

In some embodiments, the image processing apparatus further includes a wide-band filter. After fusing multiple narrow-band channel images in one-to-one correspondence with the multiple narrow-band filters to obtain a color image including a contour of the target object, the acquisition module 5551 may be further configured to: acquire the target object through the wide-band filter to obtain a wide-band channel image including the target object; and perform image enhancement processing on the color image including the contour of the target object based on the wide-band channel image to obtain the enhanced color image.

In some embodiments, the acquisition module 5551 may be further configured to acquire a pathological tissue through each of the narrow-band filters to obtain a narrow-band channel pathological image including the pathological tissue. The fusion module 5552 may be further configured to fuse multiple narrow-band channel pathological images in one-to-one correspondence with the multiple narrow-band filters to obtain a color pathological image including a contour of the pathological tissue.

Some embodiments of the disclosure provide a computer program product. The computer program product includes computer programs or computer instructions. The computer-executable instructions are stored in a computer-readable storage medium. A processor of an electronic device reads the computer-executable instructions from the computer-readable storage medium. The processor executes the computer-executable instructions, whereby the electronic device performs the image processing method according to the foregoing embodiment of the disclosure.

Some embodiments of the disclosure provide a computer-readable storage medium storing computer-executable instructions. The computer-executable instructions are stored therein. When executed by a processor, the computer-executable instructions may trigger the processor to perform the image processing method according to some embodiments of the disclosure, for example, the image processing method shown in FIG. 5A to FIG. 5B.

In some embodiments, the computer-readable storage medium may be a memory such as FRAM, ROM, PROM, EPROM, EEPROM, flash memory, magnetic surface memory, optical disc, or CD-ROM. Various devices including one or any combination of the foregoing memories are also possible.

In some embodiments, the computer-executable instructions may take the form of program, software, software module, script, or code, may be written in any form of programming language (including compiled or interpreted languages, or declarative or procedural languages), and may be deployed in any form, including as a stand-alone program or as a module, component, subroutine, or another unit suitable for use in a computing environment.

By way of example, the executable instructions may, but need not, correspond to files in a file system, and may be stored in a portion of a file that stores other programs or data, for example, in one or more scripts in a hyper text markup language (HTML) document, in a single file dedicated to the program in question, or in multiple coordinated files (for example, files that store one or more modules, subroutines, or portions of code).

By way of example, the computer-executable instructions may be deployed to be executed on one electronic device, or on multiple electronic devices located at one site, or on multiple electronic devices distributed across multiple sites and interconnected by a communication network.

The foregoing descriptions are merely embodiments of the disclosure and are not intended to limit the protection scope of the disclosure. Any modification, equivalent replacement, or improvement made without departing from the spirit and principle of the disclosure fall within the protection scope of the disclosure.

What is claimed is:

1. An image processing method, performed by an electronic device, the electronic device comprising multiple narrow-band filters and at least one wide-band filter, the method comprising:
acquiring a target object through each of the narrow-band filters to obtain a narrow-band channel image comprising the target object, the narrow band filters comprising at least three filters with each narrow-band filter configured to output a respective channel of infrared color, and the at least one wide-band filter is configured to output a grey narrow-band channel image without a narrow band filtering effect;
fusing multiple narrow-band channel images in one-to-one correspondence with the multiple narrow-band filters to obtain a color image comprising a contour of the target object;
acquiring the target object through the at least one wide-band filter to obtain a grayscale wide-band channel image comprising the target object, the grayscale wide-band channel image having no wavelength differentiation; and
performing image enhancement processing on the color image comprising the contour of the target object based on the grayscale wide-band channel image to obtain the enhanced color image that also comprises the contour of the target object.

2. The method according to claim 1, wherein
the electronic device comprises a photosensitive chip, and the multiple narrow-band filters are regularly arranged on the photosensitive chip in a matrix form;
the acquiring a target object through each of the narrow-band filters to obtain a narrow-band channel image comprising the target object comprises:
performing image acquisition processing on the target object through the photosensitive chip to obtain an image comprising the target object;
performing channel splitting processing on the image comprising the target object based on each of the narrow-band filters in the photosensitive chip to obtain an intermediate channel image corresponding to each of the narrow-band filters; and
interpolating the intermediate channel image corresponding to each of the narrow-band filters to obtain the narrow-band channel image corresponding to each of the narrow-band filters.

3. The method according to claim 2, wherein the performing channel splitting comprises:
performing the following processing on any one of the narrow-band filters in the photosensitive chip:

determining a position of the narrow-band filter in the photosensitive chip;

performing pixel extraction processing on the image comprising the target object based on the position of the narrow-band filter in the photosensitive chip to obtain pixels of the narrow-band filter; and arranging the pixels of the narrow-band filter based on arrangement of the narrow-band filter in the photosensitive chip to obtain the intermediate channel image corresponding to the narrow-band filter.

4. The method according to claim 1, wherein the multiple narrow-band channel images have the same size; the multiple narrow-band channel images are obtained by performing channel splitting processing on the image comprising the target object;

the fusing comprises:

performing the following processing on any pixel in the image comprising the target object:

determining a pixel value of the pixel corresponding to each of the multiple narrow-band channel images;

synthesizing the pixel values of the pixels corresponding to the multiple narrow-band channel images to obtain multi-channel pixel values of the pixels; and stitching the multi-channel pixel values of the multiple pixels to obtain the color image comprising the contour of the target object.

5. The method according to claim 1, wherein the fusing comprises:

determining partial narrow-band filters from the multiple narrow-band filters; and fusing narrow-band channel images corresponding to the partial narrow-band filters to obtain the color image comprising the contour of the target object.

6. The method according to claim 5, wherein the determining comprises:

displaying filtering indexes of the multiple narrow-band filters; and taking, in response to a selection operation for the filtering indexes, narrow-band filters corresponding to selected filtering indexes as the partial narrow-band filters.

7. The method according to claim 5, wherein the determining comprises:

obtaining frequencies in which the multiple narrow-band filters are used; and sorting the multiple narrow-band filters in descending order based on the frequencies in which the multiple narrow-band filters are used, and taking multiple narrow-band filters ranked first in a descending sorting result as the partial narrow-band filters.

8. The method according to claim 1, wherein the electronic device comprises at least four narrow-band filters, and the fusing comprises:

determining any three narrow-band filters from the multiple narrow-band filters;

synthesizing narrow-band channel images corresponding to the any three narrow-band filters to obtain candidate color images;

performing edge detection processing on each of the candidate color images to obtain edge features of each of the candidate color images; and taking a candidate color image with the most edge features as the color image comprising the contour of the target object.

9. The method according to claim 1, wherein the acquiring comprises:

acquiring a pathological tissue through each of the narrow-band filters to obtain a narrow-band channel pathological image comprising the pathological tissue; and the fusing comprises:

fusing multiple narrow-band channel pathological images in one-to-one correspondence with the multiple narrow-band filters to obtain a color pathological image comprising a contour of the pathological tissue.

10. An electronic device, comprising:

a housing, configured to form a partially enclosed space;

at least one memory configured to store program code;

multiple narrow-band filters and at least one wide band filter, located on a photosensitive chip inside the housing and configured to: acquire an optical signal, the photosensitive chip being configured to output a photosensitive signal, wherein the multiple narrow-band filters comprising at least three filters with each narrow-band filter being configured to output a respective channel of infrared color, and wherein the at least one wide-band filter is configured to output a grey narrow-band channel image without a narrow-band filtering effect; and at least one processor, located inside the housing and configured to read the program code and operate as instructed by the program code, the program code comprising:

receiving code configured to cause the at least one processor to receive the photosensitive signal which is outputted by the photosensitive chip and is an optical signal of a target object acquired by the multiple narrow-band filters, generate a narrow-band channel image comprising the target object based on the photosensitive signal, fusing code configured to cause the at least one processor to fuse multiple narrow-band channel images in one-to-one correspondence with the multiple narrow-band filters to obtain a color image comprising a contour of the target object, grayscale wide band channel image acquiring code configured to cause the at least one processor to acquire the target object through the at least one wide-band filter to obtain a grayscale wide-band channel image comprising the target object, the grayscale wide-band channel image having no wavelength differentiation; and enhanced color image obtaining code configured to cause the at least one processor to perform image enhancement processing on the color image comprising the contour of the target object based on the grayscale wide-band channel image to obtain the enhanced color image that also comprises the contour of the target object.

11. The electronic device according to claim 10, wherein the multiple narrow-band filters are regularly arranged on the photosensitive chip in a matrix form; and the program code further comprises:

generating code configured to cause the at least one processor to generate an image comprising the target object based on the photosensitive signal, splitting code configured to cause the at least one processor to perform channel splitting processing on the image comprising the target object based on each of the narrow-band filters in the photosensitive chip to obtain an intermediate channel image corresponding to each of the narrow-band filters, and interpolation code configured to cause the at least one processor to interpolate the intermediate channel image corresponding to each of the narrow-band filters to obtain the narrow-band channel image corresponding to each of the narrow-band filters.

12. The electronic device according to claim 10, further comprising:
an achromatic lens, disposed inside the housing and configured to focus narrow-band waves acquired by the multiple narrow-band filters onto the photosensitive chip.

13. The electronic device according to claim 12, wherein the achromatic lens further comprises:
a focusing ring, disposed on a surface of the achromatic lens and configured to adjust a focal length of the achromatic lens; or,
a liquid lens, disposed on the achromatic lens and configured to adjust the focal length of the achromatic lens.

14. The electronic device according to claim 10, further comprising:
a diaphragm, disposed inside the housing and configured to protect the photosensitive chip and the processor, the type of the diaphragm comprising at least one of the following: a long-pass filter, a polarizer, and an attenuator.

15. The electronic device according to claim 10, further comprising:
a light source apparatus, disposed inside the housing and configured to provide at least one light source, the type of light source comprising at least one of the following: a wide-band light source and a narrow-band light source,
an illumination mode of the light source apparatus comprising at least one of the following: an always-on mode and a flashlight mode.

16. The electronic device according to claim 10, wherein the fusing code is further configured to:
perform the following processing on any pixel in the image comprising the target object:
determine a pixel value of the pixel corresponding to each of the multiple narrow-band channel images;
synthesize the pixel values of the pixels corresponding to the multiple narrow-band channel images to obtain multi-channel pixel values of the pixels; and
stitch the multi-channel pixel values of the multiple pixels to obtain the color image comprising the contour of the target object.

17. The electronic device according to claim 10, wherein the fusing code is further configured to:
determine partial narrow-band filters from the multiple narrow-band filters; and
fuse narrow-band channel images corresponding to the partial narrow-band filters to obtain the color image comprising the contour of the target object.

18. The electronic device according to claim 17, wherein the determining further comprises:
obtaining frequencies in which the multiple narrow-band filters are used; and
sorting the multiple narrow-band filters in descending order based on the frequencies in which the multiple narrow-band filters are used, and taking multiple narrow-band filters ranked first in a descending sorting result as the partial narrow-band filters.

19. A non-transitory computer-readable medium storing computer code that when executed by at least one processor causes the at least one processor to:
acquire a target object through each of multiple narrow-band filters to obtain a narrow-band channel image comprising the target object, the narrow band filters comprising at least three filters with each narrow-band filter configured to output a respective channel of infrared color;
fuse multiple narrow-band channel images in one-to-one correspondence with the multiple narrow-band filters to obtain a color image comprising a contour of the target object,
acquire the target object through at least one wide-band filter to obtain a grayscale wide-band channel image comprising the target object, the grayscale wide band channel image having no wavelength differentiation, the at least one wide-band filter being configured to output a grey narrow-band channel image without a narrow-band filtering effect; and
perform image enhancement processing on the color image comprising the contour of the target object based on the grayscale wide-band channel image to obtain the enhanced color image that also comprises the contour of the target object.

* * * * *